United States Patent
Takase et al.

(10) Patent No.: US 10,644,292 B2
(45) Date of Patent: May 5, 2020

(54) BATTERY WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP); SUMITOMO ELECTRIC PRINTED CIRCUITS, INC., Koka-shi, Shiga (JP); TOYOTA JIDOSHA KABUSHIKI KAISHA, Toyota-shi, Aichi (JP)

(72) Inventors: Shinichi Takase, Yokkaichi (JP); Nobuyuki Matsumura, Yokkaichi (JP); Toshifumi Uchita, Koka (JP); Yusuke Suzuki, Toyota (JP); Junta Katayama, Toyota (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP); SUMITOMO ELECTRIC PRINTED CIRCUITS, INC. (JP); TOYOTA JIDOSHA KABUSHIKI KAISHA (JP)

( * ) Notice: Subject to any disclaimer, the term of this patent is extended or adjusted under 35 U.S.C. 154(b) by 1 day.

(21) Appl. No.: 15/746,579

(22) PCT Filed: Jul. 13, 2016

(86) PCT No.: PCT/JP2016/070634
§ 371 (c)(1),
(2) Date: Jan. 22, 2018

(87) PCT Pub. No.: WO2017/018213
PCT Pub. Date: Feb. 2, 2017

(65) Prior Publication Data
US 2018/0219204 A1    Aug. 2, 2018

(30) Foreign Application Priority Data
Jul. 24, 2015    (JP) .................... 2015-146595

(51) Int. Cl.
*H01M 2/20*    (2006.01)
*H01M 2/34*    (2006.01)
(Continued)

(52) U.S. Cl.
CPC ........... *H01M 2/206* (2013.01); *H01M 2/348* (2013.01); *H01M 10/48* (2013.01);
(Continued)

(58) Field of Classification Search
CPC .... H01M 2/206; H01M 10/482; H01M 2/348; H01M 10/48; H01M 2200/106;
(Continued)

(56) References Cited

U.S. PATENT DOCUMENTS 9,024,572 B2    5/2015    Nishihara et al.
9,705,161 B2    7/2017    Nishihara et al.
(Continued)

FOREIGN PATENT DOCUMENTS

JP    6241641 U    3/1987
JP    63-142869    9/1988
(Continued)

OTHER PUBLICATIONS

International Search Report and Written Opinion dated Aug. 30, 2016.
(Continued)

*Primary Examiner* — Maria Laios
*Assistant Examiner* — Kwang Han
(74) *Attorney, Agent, or Firm* — Gerald E. Hespos; Michael J. Porco; Matthew T. Hespos

(57) ABSTRACT

A battery wiring module is attached to a cell group including an arrangement of a plurality of cells having positive pole and negative pole electrode terminals. The battery wiring module is provided with: a plurality of connection members connecting the positive pole and negative pole electrode terminals of adjacent cells of the plurality of cells; and a flexible printed board including a plurality of voltage sensing wires for sensing voltages of the plurality of cells via the plurality of connection members. Each of the voltage sensing wires has an electric current limiting element provided somewhere therealong to limit a flow of overcurrent in the voltage sensing wires. The electric current limiting element is connected to the voltage sensing wires at a portion which is overcoated with an insulating resin.

5 Claims, 6 Drawing Sheets

(51) Int. Cl.
*H01M 10/48* (2006.01)
*H01M 10/42* (2006.01)

(52) U.S. Cl.
CPC ........ *H01M 10/482* (2013.01); *H01M 10/425* (2013.01); *H01M 2010/4271* (2013.01); *H01M 2200/00* (2013.01); *H01M 2200/103* (2013.01); *H01M 2200/106* (2013.01); *H01M 2220/20* (2013.01)

(58) Field of Classification Search
CPC ....... H01M 2200/103; H01M 2200/00; H01M 2220/20; H01M 10/425; H01M 2010/4271

See application file for complete search history.

(56) References Cited

U.S. PATENT DOCUMENTS

| | | |
|---|---|---|
| 2010/0271223 A1 | 10/2010 | Ohkura et al. |
| 2011/0024205 A1 | 2/2011 | Nishihara et al. |
| 2011/0101920 A1 | 5/2011 | Seo et al. |
| 2011/0156618 A1 | 6/2011 | Seo et al. |
| 2011/0248719 A1* | 10/2011 | Aoki .................. H01M 10/482 |
| | | 324/426 |
| 2012/0019061 A1 | 1/2012 | Nishihara et al. |
| 2014/0017533 A1 | 1/2014 | Nishihara et al. |
| 2016/0365562 A1* | 12/2016 | Sugiyama ............. H01M 2/206 |

FOREIGN PATENT DOCUMENTS

| | | |
|---|---|---|
| JP | 2010-257775 | 11/2010 |
| JP | 2011-049158 | 3/2011 |
| JP | 2011222285 | 11/2011 |
| JP | 2012-28186 | 2/2012 |
| JP | 2013-251294 | 12/2013 |
| JP | 2015133394 A | 7/2015 |
| WO | 2010/113455 | 10/2010 |
| WO | 2012/131809 | 10/2012 |

OTHER PUBLICATIONS

Japanese Office action dated Dec. 8, 2017.
Japanese Office Action dated Jun. 14, 2018.

* cited by examiner

BATTERY WIRING MODULE

BACKGROUND

Field of the Invention

The present invention relates to a battery wiring module, and particularly to the short-circuit protection for wiring included in a battery wiring module.

Description of the Related Art

In battery modules for electric vehicles and hybrid vehicles, a number of cells are connected side by side in order to increase output. The electrode terminals of adjacent cells may be connected by connection members, such as bus bars, so as to connect a plurality of cells in series or in parallel. When the plurality of cells are connected in series or in parallel, if the battery characteristics, such as battery voltage, are not uniform between the cells, problems such as battery deterioration or damage may result.

Accordingly, in battery modules for vehicles, in order to terminate charging or discharging before abnormality is caused in the voltages between the cells, each connection member is fitted with a voltage sensing wire for sensing the voltages of the cells. By the connection member and the voltage sensing wire (corresponding to wiring), a battery wiring module is configured.

The voltage sensing wire is generally connected to an external circuit, such as a battery ECU. Accordingly, two voltage sensing wires may be short-circuited due to a trouble in the external circuit. If two voltage sensing wires are short-circuited, cells may be short-circuited, causing an overcurrent to flow in the voltage sensing wires continuously. Accordingly, it is known to provide the voltage sensing wire formed on a flexible printed board (FPC) with a series connection of an electric current limiting element, such as a positive temperature coefficient (PTC) thermistor (see Japanese Unexamined Patent Publication No. 2010-257775).

In Japanese Unexamined Patent Publication No. 2010-257775, by providing the voltage sensing wire with the electric current limiting element, it becomes possible to prevent battery module degradation due to cell short-circuit. However, when the vehicle is placed in a high humidity environment, for example, dew condensation may occur on the FPC constituting the battery wiring module and provided with the electric current limiting element.

When dew condensation occurs on the FPC, the cell-side electrodes of any two electric current limiting elements among a plurality of electric current limiting elements provided on the FPC corresponding to the respective voltage sensing wires may be short-circuited by water droplets and the like formed by the dew condensation. Short-circuiting of the cell-side electrodes of the two electric current limiting elements results in a short-circuiting of two voltage sensing wires on the cell side of the electric current limiting elements, and the electric current limiting elements for the short-circuited voltage sensing wires fail to function. As a result, an overcurrent continuously flows from the cells to the short-circuited voltage sensing wires. In this case, the voltage sensing wires cannot be protected from the overcurrent.

Accordingly, the present description provides a battery wiring module with which, in a configuration in which an electric current limiting element is series-connected somewhere along a voltage sensing wire provided on a FPC, the voltage sensing wire can be protected from overcurrent.

SUMMARY

The present description discloses a battery wiring module attached to a cell group including an arrangement of a plurality of cells having positive pole and negative pole electrode terminals, the battery wiring module including a plurality of connection members which connect the positive pole and negative pole electrode terminals of adjacent cells of the plurality of cells; and a flexible printed board including a plurality of voltage sensing wires for sensing voltages of the plurality of cells via the plurality of connection members. Each of the voltage sensing wires has an electric current limiting element provided somewhere therealong for limiting a flow of overcurrent in the voltage sensing wire. The electric current limiting element and the voltage sensing wire are connected at a portion which is overcoated with an insulating resin.

According to the present configuration, the connection portion between the electric current limiting elements and the voltage sensing wires is overcoated with the insulating resin. Accordingly, the cell-side electrodes of any two electric current limiting elements among the plurality of electric current limiting elements provided on the FPC are prevented from being short-circuited by water droplets and the like formed by dew condensation. Thus, even when dew condensation occurs on the FPC, the two electric current limiting elements function, so that, in the configuration in which the electric current limiting elements are series-connected somewhere along the voltage sensing wires provided on the FPC, the voltage sensing wires can be protected from overcurrent.

In the battery wiring module, the flexible printed board may include a plurality of connection lands for connecting the voltage sensing wires to the connection members respectively, and the electric current limiting element may be provided in the vicinity of each of the connection lands.

According to the present configuration, the electric current limiting elements are provided in the vicinity of the connection land, i.e., in the vicinity of the connection members. Accordingly, the length of the voltage sensing wires positioned between the electric current limiting elements and the connection members can be reduced. Thus, between the electric current limiting elements and the connection members, the interval in which two adjacent voltage sensing wires could be short-circuited can be made shorter. As a result, between the electric current limiting elements and the connection members, the probability of two adjacent voltage sensing wires being short-circuited can be reduced.

Herein, "the vicinity of the connection land" means, for example, the portion between both ends in the longitudinal direction (the direction in which the cells are arranged) of the connection member.

In the battery wiring module, each of the voltage sensing wires may be wired so as to include a separated wiring portion wired separately from the other voltage sensing wires. The electric current limiting element may be provided in the separated wiring portion of each of the voltage sensing wires.

According to the present configuration, by providing the separated wiring portion, the electric current limiting element can be installed on the voltage sensing wire easily, and a short-circuit is made difficult to occur between the portion in which the electric current limiting element is installed and the other voltage sensing wires.

In the battery wiring module, the electric current limiting element may be a positive temperature coefficient thermistor or a chip fuse.

According to the present configuration, when overcurrent flows in the voltage sensing wire, the resistance of the positive temperature coefficient thermistor increases or the chip fuse is blown, whereby the voltage sensing wire can be protected from overcurrent.

The battery wiring module may include a connector connected to the plurality of voltage sensing wires to externally output a sensed cell voltage.

According to the present configuration, by connecting the connector to the external circuit such as a battery ECU, charging/discharging control and the like for the cells can be easily performed.

According to the present invention, in a configuration in which an electric current limiting element is series-connected somewhere along a voltage sensing wire provided on an FPC, the voltage sensing wire can be protected from overcurrent.

DETAILED DESCRIPTION

Figure 1:
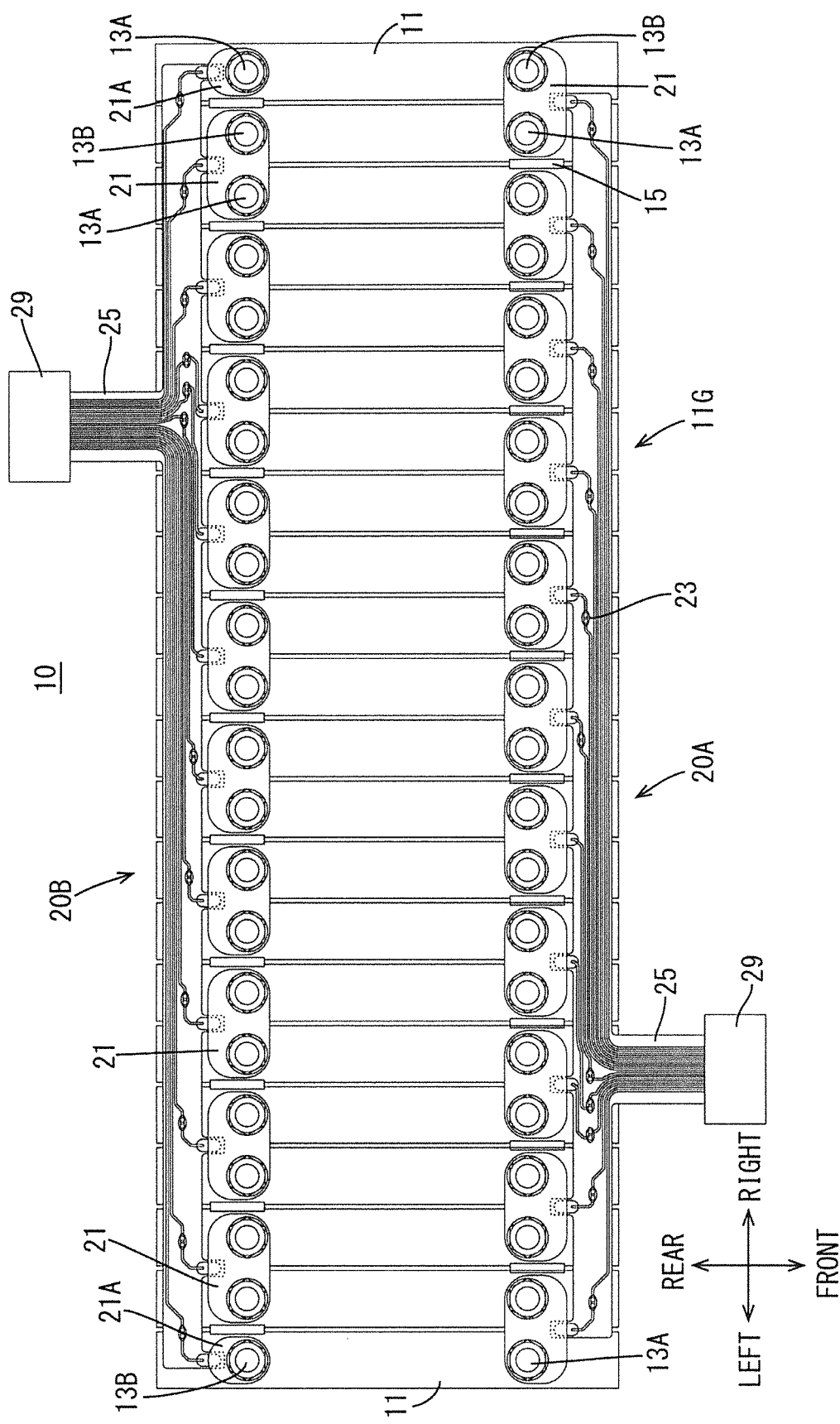
FIG. 1 is a schematic plan view of a battery module according to an embodiment.

A first embodiment of the present invention will be described with reference to FIG. 1 to FIG. 6.

1. Configuration of Battery Module

A battery module 10 according to the present embodiment is used as a drive source for electric vehicles, hybrid vehicles and the like, for example. The battery module 10 includes a cell group 11G which includes a plurality (22 in the present embodiment) of cells 11 arranged side by side each including a positive pole electrode terminal 13A and a negative pole electrode terminal 13B; and a battery wiring module 20 attached to the cell group 11G. In the following, the front indicated in FIG. 1 corresponds to the front of the battery module 10, and the rear indicated in FIG. 1 corresponds to the rear of the battery module 10. The left indicated in FIG. 1 corresponds to the left of the battery module 10, and the right indicated in FIG. 1 corresponds to the right of the battery module 10.

Between two adjacent cells 11, 11 is disposed a resin separator (not shown). The separator includes a protrusion 15 formed in a protruding shape. The protrusion 15 is disposed in a space formed between two adjacent bus bars 21, 21, and provides the function of preventing a short-circuit between electrodes due to a tool and the like.

2. Configuration of Battery Wiring Module

Figure 2:
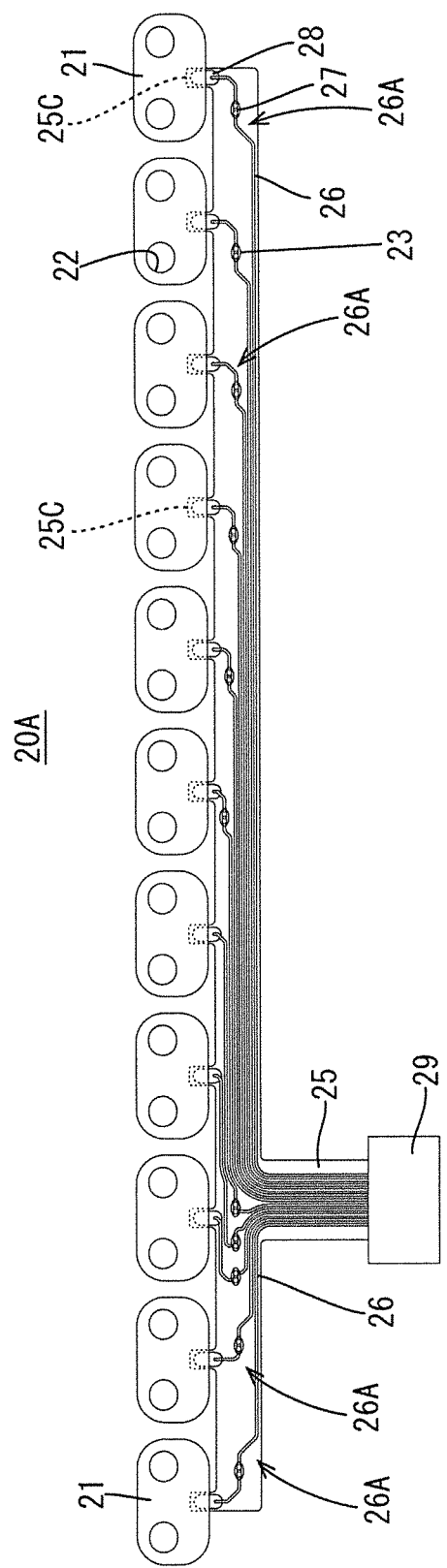
FIG. 2 is a plan view of a battery wiring module.
Figure 3:
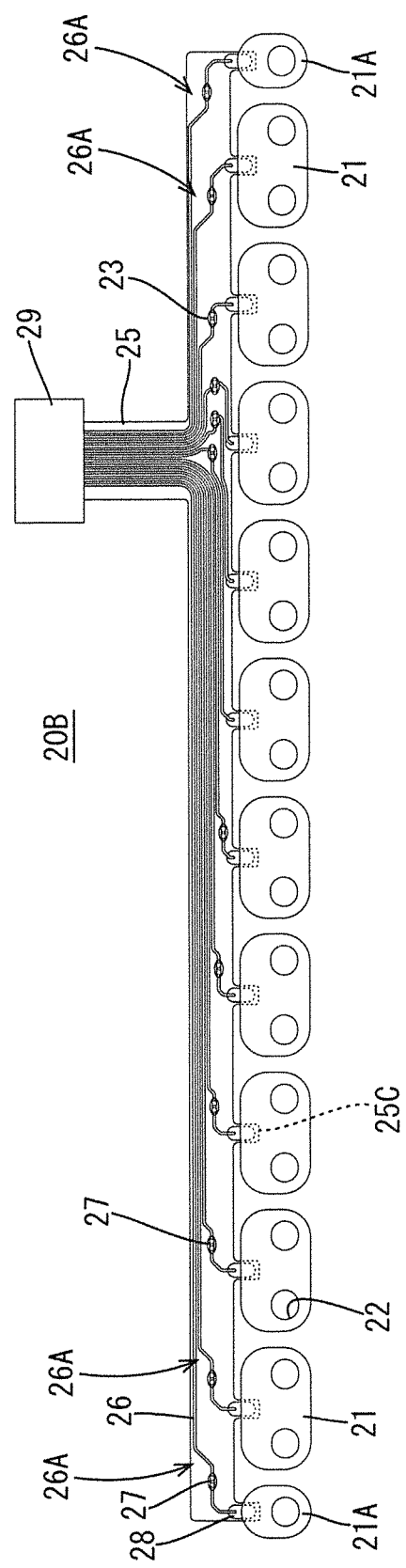
FIG. 3 is a plan view of a battery wiring module.

The battery wiring module 20 includes a battery wiring module 20A illustrated in FIG. 2 which is attached to the front of the battery module 10, and a battery wiring module 20B illustrated in FIG. 3 which is attached to the rear of the battery module 10. In the following description, the battery wiring modules 20A, 20B may be referred to as the battery wiring module 20 when the modules need not be distinguished.

The battery wiring module 20 includes a plurality of bus bars (an example of "connection member") 21, and a flexible printed board (hereafter referred to as "FPC") 25.

The bus bars 21 connect the electrode terminals 13A, 13B of different cells 11. For this purpose, each of the bus bars 21 is formed with two terminal insertion holes 22 for inserting the electrode terminals 13A, 13B of the different cells 11. As illustrated in FIG. 3, the battery wiring module 20B includes connection members 21A at both ends, each of which has one terminal insertion hole 22. The right-end connection member 21A is connected to the electrode terminal 13A from which a positive voltage that is the total of the voltages of the cells 11 is applied to a load. On the other hand, the left-end connection member 21A is connected to the electrode terminal 13B from which a ground potential is applied to the load.

The FPC 25 is connected to the respective bus bars 21, and includes a plurality of voltage sensing wires 26 for sensing the voltage of each of the cells 11 via the bus bars 21. Each of the voltage sensing wires 26 is provided with an electric current limiting element 27 for protecting the voltage sensing wires 26 from a continuous overcurrent, as illustrated in FIG. 2 and FIG. 3. The electric current limiting elements 27 may be PTC (positive temperature coefficient) thermistors or chip fuses.

Figure 5:
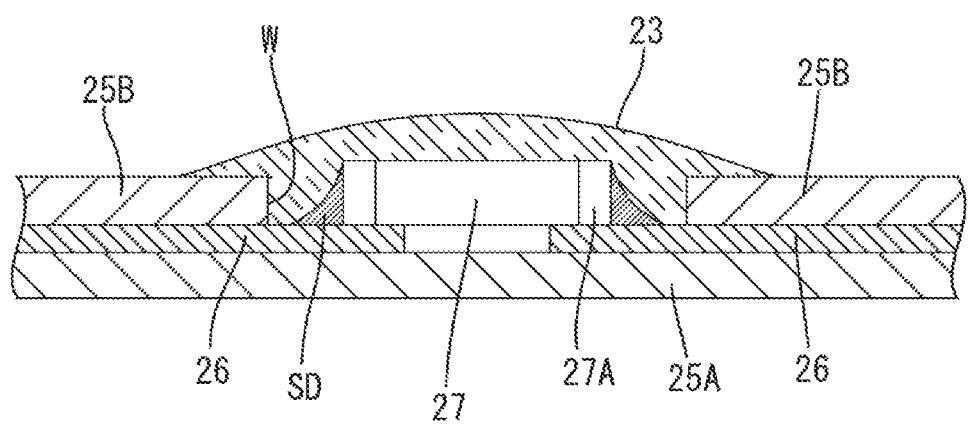
FIG. 5 is a cross sectional view taken along line A-A of FIG. 4.

Specifically, the voltage sensing wires 26 illustrated in FIG. 2 and FIG. 3 are formed by patterning a copper foil formed on a base layer 25A of the FPC 25. During patterning, as illustrated in FIG. 5, the copper foil is removed at the location where the electric current limiting element 27 is connected. That is, the electric current limiting element 27 is connected in series somewhere along the voltage sensing wire 26.

As illustrated in FIG. 2 and FIG. 3, the voltage sensing wires 26 are wired, i.e., patterned so as to include separated wiring portions 26A which are wired separately from the other voltage sensing wires 26. The electric current limiting elements 27 are provided in the separated wiring portions 26A of the respective voltage sensing wires 26.

Figure 4:
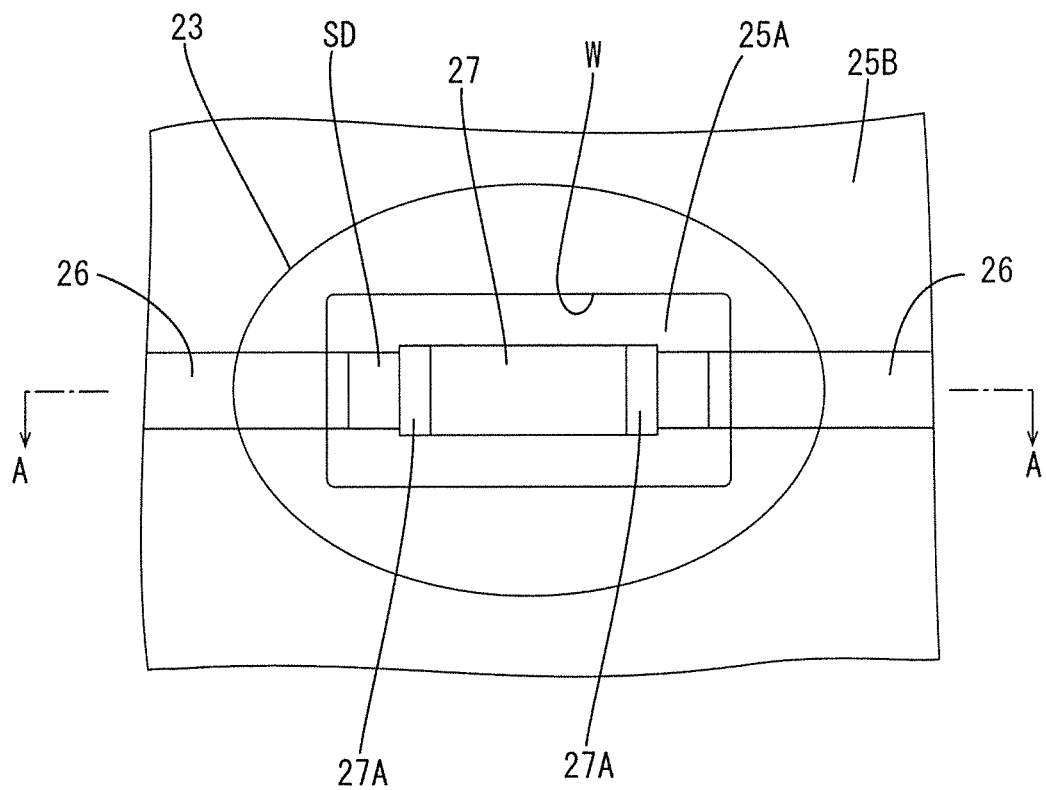
FIG. 4 is a partially enlarged plan view of areas around an electric current limiting element.

As illustrated in FIG. 4 and FIG. 5, in a coverlay layer 25B of the FPC 25 at the location where the electric current limiting element 27 is connected, a rectangular opening W is formed. The opening W exposes the voltage sensing wire 26 at the location where the electric current limiting element 27 is connected. To the exposed voltage sensing wire 26, electrodes (connection portion) 27A of the electric current limiting element 27 are bonded by solder SD, for example.

Thus, the electric current limiting elements 27 are series-connected somewhere along the voltage sensing wires 26. Accordingly, when two voltage sensing wires 26 are short-circuited due to a trouble in an external circuit, such as a battery ECU to which the battery wiring module 20 is connected, and an overcurrent from the cells 11 is produced in the voltage sensing wires 26, the flow of the overcurrent to the voltage sensing wires 26 from the cells 11 to the voltage sensing wires 26 $|_{\{41\}}$ can be limited.

For example, when the electric current limiting element 27 is a PTC thermistor, if overcurrent flows to the voltage sensing wire 26, the resistance of the PTC thermistor increases as the temperature of the voltage sensing wire 26 increases, thus limiting the flow of overcurrent. When the electric current limiting element 27 is a chip fuse, the chip fuse blows if overcurrent flowed through the voltage sensing wire 26, thus limiting the flow of overcurrent.

In this way, the voltage sensing wires 26 can be protected when overcurrent is produced in the voltage sensing wires 26 provided on the FPC 25 due to a trouble in an external circuit.

Further, as illustrated in FIG. 4 and FIG. 5, the location where the electric current limiting element 27 is connected is overcoated with an insulating resin 23 so as to cover and hide the opening W. That is, the connection portion between the electric current limiting element 27 and the voltage sensing wire 26 is overcoated with the insulating resin 23. The connection portion includes the electrodes 27A of the electric current limiting element 27, the solder SD, and the exposed portion of the voltage sensing wires 26.

At one end of each of the voltage sensing wires 26, a connection land 28 is formed which is electrically connected to the bus bars 21. The electric current limiting elements 27 are provided near the connection lands 28.

Figure 6:
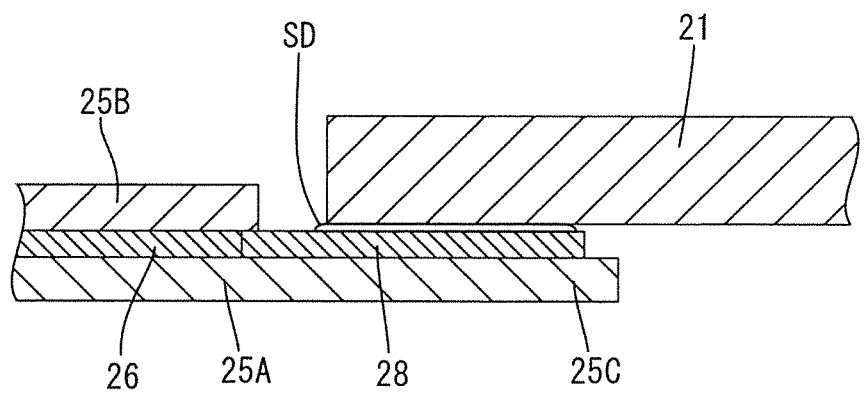
FIG. 6 is a cross sectional view illustrating a mode of connection of a bus bar and a voltage sensing wire.

Specifically, as illustrated in FIG. 6, the connection land 28 is configured from copper foil on a protruding portion 25C of the base layer 25A of the FPC 25, where the connection land 28 is continuous with the voltage sensing wire 26. In the area (protruding portion 25C) where the connection land 28 is formed, the coverlay layer 25B is not formed, so that the connection land 28 is exposed. The connection land 28 and the bus bar 21 are bonded by solder SD, for example. When the bus bar 21 is connected on the upper surface of the connection land 28 as described above, the operation for connecting the bus bar 21 to the connection land 28 is simplified compared with when the bus bar 21 is connected downward on the lower surface of the connection land 28.

Specifically, when the bus bar 21 is connected to the upper surface of the connection land 28, the soldering surface with respect to the copper foil for connecting the electric current limiting element 27 to the voltage sensing wire 26 is on the same side. In contrast, if the bus bar 21 is connected to the lower surface of the connection land 28, the soldering surface with respect to the copper foil would differ between when the electric current limiting element 27 is connected to the voltage sensing wires 26 and when the bus bar 21 is connected, resulting in a complex soldering operation.

In addition, if the bus bar 21 is connected to the lower surface of the connection land 28, an operation for removing the base layer 25A from the copper foil would be required in order to expose the connection land 28, making the operation of exposing the connection land 28 cumbersome.

The connection portions between the connection lands 28 and the bus bars 21 may be overcoated with the insulating resin 23, as in the connection portions between the electric current limiting elements 27 and the voltage sensing wires 26.

The other end of the voltage sensing wires 26 is connected to a connector 29. The connector 29 is connected to a battery ECU, not shown. The battery ECU is of a well-known configuration including a microcomputer, circuit elements and the like, and provided with the functions for sensing voltage, electric current, temperature and the like of the cells 11, and for performing charging/discharging control and the like for the cells 11.

3. Effects of Embodiment

The connection portions between the electric current limiting elements 27 and the voltage sensing wires 26 are overcoated with the insulating resin 23. Accordingly, the cell-side electrodes 27A of any two electric current limiting elements 27 among a plurality of electric current limiting elements 27 provided on the FPC 25 are prevented from being short-circuited by water droplets formed by dew condensation and the like. Thus, even if dew condensation occurs on the FPC 25, the electric current limiting elements 27 can function normally, and, in the configuration in which the electric current limiting elements 27 are series-connected somewhere along the voltage sensing wires 26 provided on the FPC 25, the voltage sensing wires 26 can be protected from overcurrent.

The electric current limiting elements 27 are provided in the vicinity of the connection lands 28, i.e., in the vicinity of the bus bars 21. Accordingly, the length of the voltage sensing wires 26 positioned between the electric current limiting element 27 and the bus bars 21 can be reduced. This makes it possible to reduce, between the electric current limiting elements 27 and the bus bars 21, the interval in which two adjacent voltage sensing wires 26 could be short-circuited. As a result, between the electric current limiting elements 27 and the bus bars 21, i.e., on the cell 11 side of the electric current limiting element 27, the probability of two adjacent voltage sensing wires 26 being short-circuited can be reduced.

Herein, "in the vicinity of the connection lands 28" means the portion between both ends in the longitudinal direction (the direction in which the cells 11 are arranged; i.e., the right-left direction in FIG. 1) of the bus bars 21; in other words, it means the portion between the connection lands 28 and one end in the longitudinal direction of the bus bars 21. This does not mean a limitation that all of the electric current limiting elements 27 are provided between both ends of the bus bars 21. For example, of all of the electric current limiting elements 27, 50% or more, 75% or more, or 90% or more of the electric current limiting elements 27 may be provided between both ends of the bus bars 21.

The voltage sensing wires 26 are wired to include the separated wiring portions 26A wired separately from the other voltage sensing wires 26, and the electric current limiting elements 27 are provided in the separated wiring portions 26A of the voltage sensing wires 26. Accordingly, the electric current limiting elements 27 can be easily installed on the voltage sensing wires 26, and a short-circuit is made difficult to occur between the electric current limiting elements 27 and the other voltage sensing wires 26.

Other Embodiments

The present invention is not limited to the embodiment described above with reference to the drawings. For example, the following embodiments are included in the technical scope of the present invention.

(1) While in the present embodiment, the FPC 25 and the bus bars 21 are connected in the configuration in which, as illustrated in FIG. 6, for example, the bus bar 21 is connected on the upper side of the FPC 25, this is not intended as a limitation. Conversely, a configuration may be adopted in which the bus bar 21 is connected on the lower side of the FPC 25. In this case, the bus bar 21 may be connected with the FPC 25 vertically inverted such that the base layer 25A of the FPC 25 becomes the upper side and the coverlay layer 25B becomes the lower side.

The mode of connection of the FPC 25 and the bus bars 21 is not limited to the electrical connection via the connection land 28, as illustrated in FIG. 6, for example. The FPC 25 and the bus bars 21 may be provided with a mechanical connection portion for reinforcing the connection by the connection land 28 alone.

(2) While in the present embodiment, as illustrated in FIG. 1, an exemplary configuration has been described in which the battery wiring module is separated into the front battery wiring module 20A and the rear battery wiring module 20B, this is not intended as a limitation. In another configuration, the battery wiring module may not be separated into the battery wiring module 20A and the battery wiring module 20B. For example, in a configuration, a connection portion for connecting the battery wiring module 20A and the battery wiring module 20B may be provided, and the battery wiring modules and the battery ECU may be connected by a single connector.

(3) The FPC 25 may be formed with a predetermined amount of warping (a margin in the direction in which the cells 11 are arranged) at predetermined interval positions, such as at the positions between the respective bus bars 21. In this case, when the battery wiring module 20 is mounted to the cell group 11G, dimensional tolerance of the cells 11 can be accommodated. That is, if there is a dimensional difference in the direction in which the cells 11 are arranged, the difference can be absorbed by the predetermined amount of warping. In this way, the operation for mounting the battery wiring module 20 to the cell group 11G can be simplified. In addition, stress applied to the FPC 25 due to dimensional tolerance of the battery 11 can be absorbed. Accordingly, the reliability of the battery wiring module 20 can be increased.

EXPLANATION OF SYMBOLS

11 Cell
11G Cell group
13A Positive electrode terminal
13B Negative electrode terminal
20, 20A, 20B Battery wiring module
21 Bus bar (connection member)
23 Insulating resin
25 FPC (flexible printed board)
26 Voltage sensing wire
27 Electric current limiting element
27A Electrode of electric current limiting element
28 Connection land

The invention claimed is:

1. A battery wiring module attached to a cell group including an arrangement of a plurality of cells having positive pole and negative pole electrode terminals, the battery wiring module comprising:
   a plurality of connection members which connect the positive pole and negative pole electrode terminals of adjacent cells of the plurality of cells; and
   a flexible printed board including:
      an insulating base layer having a first surface,
      a plurality of voltage sensing wires for respectively sensing voltages of the plurality of cells via the plurality of connection members, the voltage sensing wires being disposed on the first surface of base layer, each of the voltage sensing wires having a break somewhere therealong to define first and second voltage sensing wire segments with a space therebetween,
      electric current limiting elements connected respectively to the first and second voltage sensing wire segments across the break in each of the voltage sensing wires for limiting a flow of overcurrent in the respective voltage sensing wires,
      an overlay layer applied to the first surface of the base layer and covering the voltage sensing wires, the overlay layer having openings surrounding the electric current limiting element and areas of the voltage sensing wire segments connected thereto; and
      an insulating resin applied at each of the openings in the overlay layer, the insulating resin filling the respective openings and covering the electric current limiting element and areas of the voltage sensing wire segments connected thereto.

2. The battery wiring module according to claim 1, wherein:
   the flexible printed board includes a plurality of connection lands for connecting the voltage sensing wires to the connection members respectively; and
   the electric current limiting element is provided in the vicinity of each of the connection lands.

3. The battery wiring module according to claim 1, wherein:
   each of the voltage sensing wires is wired so as to include a separated wiring portion wired separately from the other voltage sensing wires; and
   the electric current limiting element is provided in the separated wiring portion of each of the voltage sensing wires.

4. The battery wiring module according to claim 1, wherein the electric current limiting element is a positive temperature coefficient thermistor or a chip fuse.

5. The battery wiring module according to claim 1, comprising a connector connected to the plurality of voltage sensing wires to externally output a sensed cell voltage.

* * * * *